United States Patent [19]

Urlwin-Smith

[11] Patent Number: 5,836,392

[45] Date of Patent: Nov. 17, 1998

[54] OIL AND GAS FIELD CHEMICALS

[75] Inventor: Phillip Lance Urlwin-Smith, Ascot, United Kingdom

[73] Assignee: Halliburton Energy Services, Inc., Duncan, Okla.

[21] Appl. No.: 849,904

[22] PCT Filed: Dec. 22, 1995

[86] PCT No.: PCT/GB95/03019

§ 371 Date: Aug. 5, 1997

§ 102(e) Date: Aug. 5, 1997

[87] PCT Pub. No.: WO96/19636

PCT Pub. Date: Jun. 27, 1996

[30] Foreign Application Priority Data

Dec. 22, 1994 [GB] United Kingdom .................. 9426025

[51] Int. Cl.$^6$ ..................................................... F21B 33/13
[52] U.S. Cl. .................... 166/295; 166/300; 526/307.7
[58] Field of Search ......................... 526/307.7; 166/295, 166/300

[56] References Cited

U.S. PATENT DOCUMENTS

| | | | |
|---|---|---|---|
| 2,934,524 | 4/1960 | Phelps et al. | 526/307.7 |
| 4,199,625 | 4/1980 | Pilny et al. | |
| 4,461,351 | 7/1984 | Falk. | |
| 4,785,028 | 11/1988 | Hoskin et al. | |
| 5,043,364 | 8/1991 | Moradi-Araghi. | |
| 5,133,408 | 7/1992 | Tackett. | |
| 5,465,792 | 11/1995 | Dawson et al. | |
| 5,543,446 | 8/1996 | Rodriguez | 526/307.7 |

FOREIGN PATENT DOCUMENTS

| | | | |
|---|---|---|---|
| 0 005 835 | 12/1979 | European Pat. Off. | |
| 1195050 | 6/1965 | Germany | 526/307.7 |
| 53-72049 | 6/1978 | Japan | 526/307.7 |
| 60-210608 | 10/1985 | Japan | 526/307.7 |

*Primary Examiner*—Joseph L. Schofer
*Assistant Examiner*—N. Sarofim

[57] ABSTRACT

A method for conformance control of a reservoir comprising injecting into a zone of the reservoir an aqueous solution of a co-polymer comprising at least one ethylenically unsaturated polar monomer and at least one copolymerizable ethylenically unsaturated ester formed from a hydroxy compound of the formula ROH wherein R is a selected alkyl group, alkenyl group, cycloalkyl group, aryl group or such groups substituted with from 1 to 3 hydroxyl, ether or thio ether groups or a heterocyclic or selected heterocyclic alkylene group and at least one hetereatom selected from oxygen, nitrogen and sulfur and a selected alkenoic or aralkenoic carboxylic acid or sulfonic or phosphoric acid together with a crosslinking agent comprising a multi-valent metal ion capable of crosslinking an acrylic acid polymer to form a viscous gel. The injected fluid is flowed through at least a portion of a high permeability region within said zone wherein it is heated to an elevated temperature whereupon crosslinking of the polymers occurs to form a substantially non-flowable gel within said high permeability region. The crosslinking of the injected fluid to form the non-flowable gel within the formation reduces the permeability of said region in said zone.

18 Claims, No Drawings

OIL AND GAS FIELD CHEMICALS

The present invention relates to polymers and their preparation and their use in oil and gas fields.

Oil and gas fields produce water as well as oil and/or gas, especially when the well is depleted. In addition, secondary recovery techniques such as water flooding to stimulate production of oil involve injection of water under pressure at a distance from a production well to squeeze the oil out. However, in both cases the water moves in the formation along least hindered paths, so that the recovery technique may be inefficient and in the direct recovery increased proportions of water are produced.

To enhance reservoir conformance control, i.e. mobilise the oil that may be present in less permeable areas, blocking agents may be injected to obstruct the high permeability channels thereby encouraging preference for liquid movement via the lower permeability channels. Among known blocking agents are polymer gels, in particular, gels of polyacrylic acid or polyacrylamide/polyacrylic copolymers, cross-linked with chromium ions as disclosed in U.S. Pat. Nos. 4,744,418 and 4,844,168. The copolymer, mixed with cross-linker, is injected into the formation from the production well, often after a flood of cold water to pre-cool the formation rock, to stop premature cross-linking and gelling before the mixture reaches its desired position. Much work has been described to reduce the rate of cross-linking, by reducing the activity of the cross-linking metal ion, e.g. by co-ordinating the chromium with a ligand, e.g. lactate.

An improved cross-linking system has now been discovered which comprises a composition in which the tendency of the polymer to cross-link prematurely has been reduced further by use of a copolymer of a polyacrylamide with a polar monomer.

The present invention provides a water soluble copolymer of:

(i) at least one non acidic ethylenically unsaturated polar monomer and (ii) at least one copolymerisable ethylenically unsaturated ester.

The invention also comprises compositions comprising the water soluble copolymer and a polyvalent metal ion gelling agent.

The present invention also provides a process for delaying the rate of gelling of an acrylic polymer with a gelling agent, in which the acrylic polymer is said copolymer comprising (i) and (ii).

The invention also provides a method for conformance control of a reservoir, especially one with high formation temperatures, which method comprises:

(a) injecting into the formation an aqueous solution of said composition, (b) allowing the solution to flow through at least one zone of high permeability in said formation under increasing temperature conditions, (c) allowing the composition to gel under said conditions.

The copolymer is formed from at least one, e.g. 1–3 polar monomer(s) and at least one, e.g. 1–3 ester(s), and comprises structural units derived from said monomer(s) and ester(s); preferably the copolymer consists essentially of said structural units. The ester is substantially neutral as it is a fully esterified derivative of an acid, i.e. complete ester, rather than a partial ester with free acid group(s).

The ester is usually formed from a hydroxyl compound and an ethylenically unsaturated carboxylic acid. The ethylenically unsaturated group may be in the alpha-beta or beta gamma position relative to the carboxyl group or may be further distant; preferred acids have 3–20 carbons, such as 3–12, e.g. alkenoic and aralkenoic acids with 3–6 or 9–12 carbons respectively. Examples of the acids are acrylic, methacrylic, crotonic and cinnamic acids. The hydroxyl compound is usually an alcohol and may be of formula ROH, where R is a hydrocarbyl group, preferably an alkyl group, e.g. of 1–30 or 2–30 such as 1–6, 2–6, 7–30 or 7–24 carbons, alkenyl groups, e.g. of 2–20 carbons such as 2–6 carbons, cycloalkyl group, e.g. of 5–8 carbons, aryl group, e.g. aromatic hydrocarbyl group such as 6–20 carbons or aralkyl group, e.g. of 7–24 carbons. Examples of such R groups are methyl, ethyl, n- and iso propyl, n, sec, iso and tert butyl, n, sec, iso and tert amyl and hexyl, octyl and 2-ethylhexyl, decyl, allyl, cyclohexyl, palmityl, steryl, phenyl and benzyl. The R group may also be a hydrocarbyl group, substituted by at least one substituent e.g. 1–3 substituents, especially from hydroxyl, ether, and thio ether groups; electron donating groups are preferred. Ether substituents are preferred, especially alkoxy, aryloxy and aralkoxy, in which the alkyl, aryl and aralkyl groups may be as described above. Preferably the substituent is on the same carbon atom of the R group as is bonded to the hydroxyl group in the hydroxyl compound; alkoxymethyl and aralkoxy methyl groups are preferred. The hydroxyl compound may be a primary, secondary, iso or tertiary compound, especially with a tertiary carbon atom bonded to the hydroxyl group, e.g. tert butyl and trityl. The group R may also comprise a heterocyclic group either for bonding directly to the hydroxyl group of ROH or separated therefrom by an alkylene group, e.g. of 1–4 carbons such as methylene. Thus group R may be a saturated or unsaturated heterocyclic or heterocyclic alkylene group, e.g. of 3–8 carbons and at least one, e.g. one or two ring heteroatoms selected from 0, N and S, especially 0 and/or N, examples of such groups are furyl, tetrahydrofuryl, furfuryl and tetrahydrofurfuryl, pyranyl and tetra hydropyranyl. Most preferred R groups are tert-butyl, trityl, methoxymethyl, benzyloxymethyl and tetrahydropyranyl; stearyl, iso propyl, ethyl and methyl may also be preferred.

The ester (i) may also be derived from a hydroxyl compound, e.g. of formula ROH and an ethylenically unsaturated sulphonic or phosphoric acid, which may contain 2–20 carbons, especially 2–6 carbons, such as alkenyl acids, e.g. vinyl sulphonic acid and vinyl phosphonic acid. Thus the ester may be methyl or ethyl vinyl sulphonate or phosphonate. The ester may be derived from an acid containing an ethylenically unsaturated carboxamide (e.g. acrylamido) group, as well as the sulphonic or phosphonic acid group; an example of such an acid is 2-acrylamido-2-methylpropane sulphonic acid.

The ester is copolymerised with an ethylenically unsaturated polar monomer, in which the unsaturated group is usually vinyl or alpha methyl vinyl and may be derived from an unsaturated carboxylic acid (the acid being as further described above) e.g. primary, secondary or tertiary amide thereof, in which the amide is derived from ammonia, or a primary or secondary alkylamine, e.g. of 1–10 carbons, which may optionally be substituted by at least one hydroxyl group as in alkylol amides such as ethanolamides; examples of such carboxylic derived polar monomers are acrylamide, methacrylamide and acrylic ethanol amide. The polar monomer may also be a vinyl heterocyclic compound e.g. with at least one O, S or N atom in a ring with 3–8 carbons such as one with at least one carbonyl group in the ring, e.g. N-vinyl-pyrrolidone or -caprolactam, or a vinyl pyridine.

The copolymer may contain 0.01–50% e.g. 0.1–40% or 1–30%, especially 5–15% mol of structural units from said ester(s) and 99.99–50% e.g. 99.9–60% or 99–70 or 95–85% mol of structural units from said polar monomer(s). The copolymer may be a block or non block copolymer, e.g. a regular or random copolymer or a graft copolymer, especially with ester units grafted onto polymeric polar, monomer, e.g. ester grafted on polyacrylamide.

The copolymer is usually soluble in water to an extent of at least 1 g/l e.g. 1–200 g/l such as at least 10 g/l in distilled water at 15° C., especially in aqueous sodium chloride solution containing 32 g/l NaCl at 25° C. If desired, the copolymer may be mixed with a surfactant (e.g. in amount of 0.01–5% by wt of the solution) to help solubilise it in the water or sodium chloride solution.

The copolymer may have a weight average molecular weight of at least 50,000 e.g. 50,000–20 million, such as 100,000 to 10 million, especially 100,000–500,000 or 1–10 million; the molecular weight may be determined by conventional methods, e.g. gel permeation chromatography or intrinsic viscosity. The low mole wt copolymer may have a viscosity in aqueous 3.6% wt solution at 19° C. of 10–500 cps (measured at 60 rpm with a Haake viscometer). Preferably the copolymer is sheer thinnable, e.g. with the viscosity reducing by at least 10% on increasing the sheer rate by 10%.

The copolymer may be made by conventional methods for copolymerising ethylenically unsaturated monomers in solution, emulsion or suspension, (preferably aqueous), such as are described in Encyclopaedia of Polymer Science & Engineering, Ed. Mark, Bikales, Overberger and Menges, Publ. Wiley Interscience, New York, 2nd Ed., Vol 1, pp 181–211 and references cited therein, especially L. J. Young in J Brandrup and E. H. Immergut Eds Polymer Handbook, J Wiley, New York, 2nd Ed. 1975, Sec. II and 3rd Ed. Sec. III, especially pp 155/6 and references cited therein and R Z Greenley J Macromol Science Chem. 14, 427, 445 (1980) and G Saini et al Makromol, Chem. 144, 235 (1971), the disclosure of each of which is incorporated herein by reference. Free radical aqueous suspension or emulsion polymerisation is preferred.

The composition of the invention comprises the copolymere and a polyvalent metal ion, capable of crosslinking an acrylic acid polymer in aqueous solution to form a gel. The cross-linking may be at 20°–200° C., especially 50°–150° C. The metal ion is usually 2, 3 or 4 valent and may be of group 2A, 3A, 4A, 5A, 6A, 7A, 8, 2B, 3B or 4B of the Periodic Table, e.g. Ca, Mg, Ba, Ti, Zr, Fe, Zn, Al or Sn; preferably the metal ion is 3 or 4 valent and is especially a transition metal such as chromium or iron, though aluminium may also be used. The particularly preferred metals are chromium and zirconium. The weight ratio of the metal to copolymer is usually 1:1–100 such as 1:10–80, especially 1:25–50. The ratio of the number of g atoms of metal to g moles of copolymer is usually 1000:0.001–100, preferably 1000:0.01–10, such as 1000:0.1–20 or 1–10, especially for copolymers of Molec. Wt 100,000–500,000. The ratio of the number of g atoms of metal to equivalents of ester group in the copolymer is usually 1000:0.5–5000, preferably 1000:5–5000 such as 1000:50–1000 or 1000:500–5000. The metal is usually present as a salt, e.g. an inorganic salt such as a halide especially chloride, nitrate or sulphate or as a carboxylate particularly a monodentate carboxylate, such as a hydrocarbyl monocarboxylate, e.g. with 1–24 carbon atoms (e.g. 2–6) in the carboxylic acid, which may be an alkanoic acid such as acetate. The metal may also be complexed, e.g. with a ligand, such as a carboxylic acid group, having at least 2, e.g. 2–4 dentate groups in particular, as described in Canadian Patent 2063877, the disclosure of which is herein incorporated by reference; example of complexing carboxylic acids are hydroxy alkanoic acids, e.g. lactate, glycollate or tartrate. The salt or complex is water soluble. The composition is usually made just before use by adding the copolymer and the metal ion (e.g. as salt or complex) to an aqueous medium, e.g. sea water and then injecting the aqueous composition made into the formation. The composition is preferably kept at below 50° C., e.g. below 30° C. before use. The concentration of coplymer in the aqueous composition may be 500–100,000 ppm, in particular 500–10,000 ppm for copolymers of high Molecular wt of at least 1 million and 10,000–50,000 ppm for copolymers of lower Molecular wt. 50,000–1 million. The concentration of the cross-linking metal ion in the aqueous composition may be 10–3000 ppm, especially 10–250 ppm and 3000–1500 ppm respectively for said high and low Molec wt copolymers.

The aqueous composition may be injected into the formation via a producing well or via a secondary injection well (for use with a waterflood or squeeze technique). The aqueous composition may also contain other ingredients, e.g. antioxidants and/or oxygen scavengers. The injection may, if desired, be preceded by a precooling treatment, e.g. coldwater to stop premature cross-linking but preferably the injection process is performed in its absence. The aqueous composition may simply be injected with the formation but preferably is forced into it by pumping. The formation is usually at 50°–180° C., especially 60°–100° C. or 100°–150° C. and is generally water bearing rather than oil bearing. It may be of acidic rock, e.g. sandstone or neutral to basic rock, e.g. limestone with associated formation water of e.g. pH 3–6.5 such as 4–6 or pH 6.5–8 respectively. The compositions of the invention are especially suitable for use with acidic rocks, especially at 60°–150° C.

In particular, copolymers with carboxylic esters from tertiary alkanols or arylmethanols or from ether substituted alkanols or heterocyclic alcohols may be used with acidic rocks at 60°–100° C. and esters from other hydroxy compounds e.g. primary or secondary alkanols at 100°–150° C. The well may be shut in for 1–70 hr to allow the gelling to occur and then production may be restarted.

The copolymers and compositions of the invention have a benefit of a reduced tendency to cross-linking and gelling in the well bore (i.e. reduced aggregate build up) but rapid cross-linking at the high temperatures of the formation. They therefore are less susceptible to process handing problems.

The invention is illustrated in the following Examples:

EXAMPLE 1

A 90:10 molar copolymer of acrylamide and tertiarybutyl acrylate in aqueous solution was made by free radical copolymerisation, according to the general technique of the references mentioned herein.

The copolymer had a viscosity of 55 cps in 3.6% solution in sea water at 19° C. (the viscosity being determined as described above). By gel permeation chromatography (GPC) its weight (average molecular weight) was about 295,000, the number average Molec wt was 44,900 and the peak Molec wt was 229,000.

The copolymer solution and a solution of chromium triacetate were added to API sea water (3.2% total dissolved solids) at 25° C. to give an aqueous injection solution containing 36,000 ppm copolymer and 1000 ppm Cr ion.

EXAMPLE 2

The process of Example 1 was repeated to make a 90:10 molarcopolymer of acrylamide and methyl acrylate and an injection solution therefrom. The copolymer had a viscosity of 50 cps in 3.6% solution in sea water at 19° C. (the viscosity being determined as described above). The Molec wt date (by GPC) were MW 293,000, Mn 42,600 and Peak Mo. wt. 231,000.

EXAMPLES 3 and 4

The polymerisation processes of Examples 1 and 2 are repeated to give copolymers with weight average molecular weight of 5–10 million. Each copolymer and chromium acetate are added to sea water to give an injection solution containing 3000 ppm concentration of copolymer and a 75 ppm concentration of Cr.

EXAMPLE 5

A 10 ft stainless steel tube of internal diameter ¼" was packed with quartz sand of average particle size of 90 u. API sea water (3.2% Total Dissolved Solids) was pumped into the tube at 80° C. until a constant differential pressure was obtained. The absolute permeability of the sand pack was calculated by means of Darcy's law to be 1206 MilliDarcies. The tube was then flooded with Forties Crude Oil containing 15% toluene followed by another flush of API sea water to constant differential pressure. The permeability of the sand pack at residual oil saturation was calculated to be 280 MilliDarcies.

The aqueous injection solution of Example 1 was pumped into the tube (maintained at 80° C. by means of an oven) at a flow rate of 10 mls/hr and in such a way as to maintain a retention time of ½ hour in the inlet tube at 80° C. prior to entry into the sand pack. The maximum pressure limit was set at 100 bar and this limit was reached after approximately four hours, after which the injection solution was automatically injected at a progressively lower flow rate. The injection solution was left to "squeeze" into the tube for approximately a further 16 hours by which time no further flow could be detected. A total of 55 mls of the solution had flowed into the sand pack. In order to ascertain the depth of the gel block the tube was placed under reverse flow while maintaining a differential pressure of 100 bar. During this operation, five inch sections of tube were cut from the outlet end (previously the inlet end) until the flow could be detected. The tube was thus found to be blocked to at least 9 feet.

EXAMPLE 6

A 10 foot tube, as in Example 5, was found to have an absolute permeability of $117_m$D and a permeability of $263_m$D at residual oil saturation.

The injection solution of Example 2 was used in the gellation test of Example 5 under identical conditions to Example 5, except that the oven temperature was at 110° C. A total of 58 mls of injection of solution had been pumped prior to blocking and the tube was found to be blocked in a depth of 9.5 feet.

EXAMPLES 7 and 8

The processes of Examples 5 and 6 are repeated with the injection solutions of Examples 3 and 4. Gellation caused blocking.

I claim:

1. A method for conformance control of a reservoir comprising:

injecting into a zone of the reservoir an aqueous solution of a co-polar comprising at least one ethylenically unsaturated polar monomer and at least one copolymerizable ethylenically unsaturated ester formed from a hydroxy compound of the formula ROH wherein R is an alkyl group of 4–30 carbons, alkenyl group of 4–20 carbons, cycloalkyl group of 5–8 carbons, aryl group of 6–20 carbons or such groups, substituted with from 1 to 3 hydroxyl, ether or thio ether groups or a heterocyclic or heterocyclic alkylene group of from 3–8 carbons and at least one heteroatom selected from oxygen, nitrogen and sulfur and an alkenoic or aralkenoic carboxylic acid having from 4–20 carbons or sulfonic or phosphoric acid having from 2–20 carbons together with a crosslinking agent comprising a multi-valent metal ion capable of crosslinking an acrylic acid polymer to form a viscous gel;

allowing the solution to flow through at least a portion of a high permeability region within said zone wherein it is heated to a temperature of at least about 20° C. while maintained at a pH above about 6.5 whereupon crosslinking occurs to form a substantially non-flowable gel within said high permeability region which reduces the permeability of said region in said zone.

2. The method of claim 1 wherein said solution is heated to a temperature above about 90° C. in said region of said reservoir.

3. The method of claim 1 wherein R comprises at least one member selected from the groups of N, sec, iso or tertiary butyl, n, sec, iso or tertiary amyl, n, sec, iso or tertiary hexyl, octyl, 2-ethylhexyl, decyl, allyl, cyclohexyl, palmityl, stearyl, phenyl, benzyl, furyl, tetrahydrofuryl, furfuryl, tetrahydrofurfuryl pyranyl and tetrahydropyranyl.

4. The method of claim 1 wherein R comprises at least one member selected from the group of tertiary butyl, trityl, benzyloxymethyl, stearyl and tetrahydropyranyl.

5. The method of claim 1 wherein the multi-valent ion os said crosslinking agent comprises at least one member selected from chromium, iron, aluminum and zirconium.

6. The method of claim 1 wherein said solution is heated to a temperature in the range of from about 90°–150° C. in said high permeability region.

7. A method of blocking a high permeability region in a zone of a subterranean formation penetrated by a wellbore comprising:

injecting into a zone of a subterranean formation having a temperature of from about 60°–150° C. an aqueous solution of a copolymer comprising at least one ethylenically unsaturated polar monomer and at least one copolymerizable ethylenically unsaturated ester formed from a hydroxy compound of the formula ROH wherein R is an alkyl group of 4–30 carbons, alkenyl group of 4–20 carbons, cycloalkyl group of 5–8 carbons, aryl group of 6–20 carbons or such groups, substituted with from 1 to 3 hydroxyl, ether or thio ether groups or a heterocyclic or heterocyclic alkylene group of from 3–8 carbons and at least one heteroatom selected from oxygen, nitrogen and sulfur and an alkenoic or aralkenoic carboxylic acid having from 4–20 carbons or sulfonic or phosphoric acid having from 2–20 carbons together with a crosslinking agent comprising a multi-valent metal ion capable of crosslinking an acrylic acid polymer to form a viscous gel;

shutting-in said wellbore for from about 1 to about 70 hours.

8. The method of claim 7 wherein said formation is sandstone having a formation water pH of from about 3–6.5.

9. The method of claim 7 wherein said formation is limestone having a formation water pH of from about 6.5–8.

10. The method of claim 7 wherein R comprises at least one member selected from the groups of N, sec, iso or tertiary butyl, n, sec, iso or tertiary amyl, n, sec, iso or tertiary hexyl, octyl, 2-ethylhexyl, decyl, allyl, cyclohexyl, palmityl, stearyl, phenyl, benzyl, furyl, tetrahydrofuryl, furfuryl, tetrahydrofurfuryl pyranyl and tetrahydropyranyl.

11. The method of claim 7 wherein R comprises at least one member selected from the group of tertiary butyl, trityl, benzyloxymethyl, stearyl and tetrahydropyranyl.

12. The method of claim 7 wherein the multi-valent ion os said crosslinking agent comprises at least one member selected from chromium, iron, aluminum and zirconium.

13. A method for reducing the permeability of a relatively higher permeability zone of a subterranean sandstone formation penetrated by a wellbore comprising introducing into the relatively higher permeability zone of said formation through said wellbore a quantity of an aqueous solution of a copolymer comprising at least one copolymerizable ethylenically unsaturated ester formed from a hydroxy compound of the formula ROH wherein R is an alkyl group of 4–30 carbons, alkenyl group of 4–20 carbons, cycloalkyl group of 5–8 carbons, aryl group of 6–20 carbons or such groups, substituted with from 1 to 3 hydroxyl, ether or thio ether groups or a heterocyclic or heterocyclic alkylene group of from 3–8 carbons and at least one heteroatom selected from oxygen, nitrogen and sulfur and an alkenoic or aralkenoic carboxylic acid having from 4–20 carbons or sulfonic or phosphoric acid having from 2–20 carbons together with a crosslinking agent comprising a multi-valent metal ion capable of crosslinking an acrylic acid polymer to form a viscous gel; and heating said aqueous solution to a temperature in excess of about 90° C. within said formation while subjecting said solution to an acidic pH of below about 6.5 whereupon a crosslinking reaction occurs to form a substantially non-flowable gel in said formation to substantially non-flowable gel in said formation to substantially decrease the permeability of the portion of said formation occupied by said gel.

14. The method of claim 13 wherein said solution is heated to a temperature above about 90° C. in said region of said reservoir.

15. The method of claim 13 wherein R comprises at least one member selected from the groups of N, sec, iso or tertiary butyl, n, sec, iso or tertiary amyl, n, sec, iso or tertiary hexyl, octyl, 2-ethylhexyl, decyl, allyl, cyclohexyl, palmityl, stearyl, phenyl, benzyl, furyl, tetrahydrofuryl, furfuryl, tetrahydrofurfuryl pyranyl and tetrahydropyranyl.

16. The method of claim 13 wherein R comprises at least one member selected from the group of tertiary butyl, trityl, benzyloxymethyl, stearyl and tetrahydropyranyl.

17. The method of claim 13 wherein the multivalent ion os said crosslinking agent comprises at least one member selected from chromium, iron, aluminum and zirconium.

18. The method of claim 13 wherein said solution is heated to a temperature in the range of from about 90°–150° C. in said high permeability region.

* * * * *